No. 697,290. Patented Apr. 8, 1902.
D. J. SULLIVAN.
NUT LOCK.
(Application filed Sept. 20, 1901.)
(No Model.)
Fig. 1.
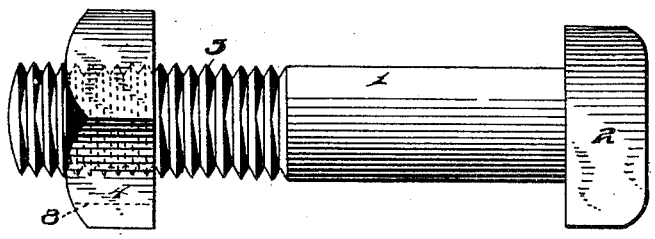
Fig. 2.   Fig. 3.
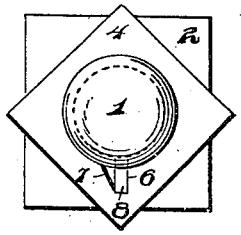   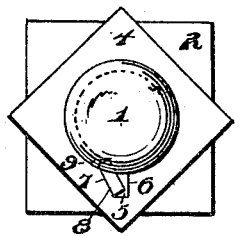
Fig. 4.
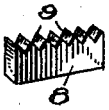
Witnesses:
J. P. Appleman,
E. E. Potter.
Inventor
D. J. Sullivan,
By
N. C. Everett Co.
Attys.
THE NORRIS PETERS CO., PHOTO-LITHO., WASHINGTON, D. C.

UNITED STATES PATENT OFFICE.

DENIS J. SULLIVAN, OF MANNINGTON, WEST VIRGINIA.

NUT-LOCK.

SPECIFICATION forming part of Letters Patent No. 697,290, dated April 8, 1902.

Application filed September 20, 1901. Serial No. 75,747. (No model.)

*To all whom it may concern:*

Be it known that I, DENIS J. SULLIVAN, a citizen of the United States of America, residing at Mannington, in the county of Marion and State of West Virginia, have invented certain new and useful Improvements in Nut-Locks, of which the following is a specification, reference being had therein to the accompanying drawings.

This invention relates to certain new and useful improvements in nut-locks, and has for its object the provision of novel means to lock a nut upon a bolt at any desired point.

The invention further aims to provide a nut-lock that may be used upon the present style of nuts and bolts without the necessity of changing the bolt in any particular.

The invention has for its further object to construct a nut-lock that will be extremely simple in construction, strong, durable, and comparatively inexpensive to manufacture; furthermore, one that will be highly efficient in its use.

The invention, briefly described, consists in forming a recess in the nut of a peculiar shape to receive a threaded lock, which when placed in a certain position will effectually lock the nut to the bolt and when tilted to another position will allow the nut to be readily removed from the bolt or driven home.

The invention still further consists in the novel combination and arrangement of parts to be hereinafter more fully described, and specifically pointed out in the claim.

In describing the invention in detail reference is had to the accompanying drawings, forming a part of this specification, and wherein like numerals of reference indicate corresponding parts throughout the several views, in which—

Figure 1 is a side elevation of a nut and bolt, showing my improvements. Fig. 2 is an end view showing the position of the lock when the nut is applied or when it is desired to remove the same. Fig. 3 is a similar view showing the nut and bolt in a locked position. Fig. 4 is a perspective view of the lock.

In the drawings the reference-numeral 1 indicates the body portion of the bolt, 2 the head thereof, and 3 the threaded portion of the bolt.

The numeral 4 represents the nut, which may be square, as shown in the drawings, or it may be hexagonal or octagonal, as the case may be. In the nut 4 is formed a recess 5, having a square shoulder 6 and an inclined shoulder 7.

The reference-numeral 8 indicates the lock, having a serrated face 9, said serrations corresponding with the threads of the nut and bolt.

The manner of operating my improved nut-lock is as follows: The nut carrying the lock is placed upon the bolt and may be readily applied to the threaded portion of the bolt to the desired point. By slightly reversing the nut in the opposite direction the lock will assume the position as shown in Fig. 3 of the drawings and will set itself against the inclined shoulder 7, formed in the recess 5 of the nut, which will effectually lock the same. The nut cannot then be removed unless the thread is stripped by force. In order to remove the nut from the bolt, an instrument is inserted in the opening to tilt the lock to the upright position, as shown in Fig. 2 of the drawings, the key or instrument being firmly held in this position when the nut is removed.

The many advantages obtained by the use of my improved device will be readily apparent from the foregoing description, taken in connection with the accompanying drawings.

It will be noted that various changes may be made in the details of construction without departing from the general spirit of my invention.

Having fully described my invention, what I claim as new, and desire to secure by Letters Patent, is—

In a nut-lock, the combination with a bolt, of a nut having a recess formed therein the bottom wall of which is square and at right-angles to one side wall thereof, the other side wall of said recess being at an obtuse angle to said bottom wall, a lock of a substantially rectangular form in cross-section, a series of serrations on the upper edge of said lock corresponding to the threads of said bolt, said lock being movably inserted in said recess with its bottom and one side engaging the bottom wall and right-angular wall of the recess, and adapted to have its said serrations and its other side wall engage said angular wall of the recess with its lower face out of engagement with the bottom wall of the recess when in a locked position, substantially as described.

In testimony whereof I affix my signature in the presence of two witnesses.

DENIS J. SULLIVAN.

Witnesses:
JOHN NOLAND,
E. E. POTTER.